United States Patent
Itakura et al.

[11] Patent Number: 5,914,457
[45] Date of Patent: Jun. 22, 1999

[54] ACTIVATED CHARCOAL CANISTER

[75] Inventors: Hideaki Itakura, Okazaki; Naoya Kato, Ama-gun; Tohru Yoshinaga, Okazaki; Tokio Kohama, Nishio; Kazuto Maeda, Nisshin, all of Japan

[73] Assignee: Nippondenso Co., Ltd., Kariya, Japan

[21] Appl. No.: 08/677,577

[22] Filed: Jul. 8, 1996

[30] Foreign Application Priority Data

Jul. 6, 1995 [JP] Japan .................................. 7-195896

[51] Int. Cl.$^6$ .................................................. B01D 53/04
[52] U.S. Cl. .......................... 96/130; 55/385.3; 95/146; 96/131; 96/144; 96/153; 123/519
[58] Field of Search ....................... 96/121, 130, 131, 96/132, 143, 144, 147, 152, 153, 154; 95/146; 123/519; 55/385.3

[56] References Cited

U.S. PATENT DOCUMENTS

| | | | |
|---|---|---|---|
| 3,730,158 | 5/1973 | St. Amand | 96/130 |
| 3,844,739 | 10/1974 | Alfrey, Jr. | 95/146 |
| 4,306,894 | 12/1981 | Fukami et al. | 96/131 |
| 4,381,929 | 5/1983 | Mizuno et al. | 123/519 |
| 4,386,947 | 6/1983 | Mizuno et al. | 55/130 |
| 4,496,379 | 1/1985 | Kozawa | 96/130 |
| 4,951,643 | 8/1990 | Sato et al. | 123/519 |
| 5,148,793 | 9/1992 | Reddy | 96/131 |
| 5,207,808 | 5/1993 | Haruta et al. | 96/131 |
| 5,538,542 | 7/1996 | Watanabe et al. | 95/146 |
| 5,538,543 | 7/1996 | Watanabe et al. | 95/146 |

FOREIGN PATENT DOCUMENTS

| | | | |
|---|---|---|---|
| 56-168816 | 12/1981 | Japan | 96/130 |
| 57-7224 | 1/1982 | Japan | 96/131 |
| 57-176351 | 10/1982 | Japan | 123/519 |
| 63-154850 | 6/1988 | Japan | 123/519 |
| 63-198464 | 12/1988 | Japan . | |
| 4-66764 | 3/1992 | Japan | 123/519 |
| 5-033734 | 2/1993 | Japan . | |
| 6-159163 | 6/1994 | Japan . | |

*Primary Examiner*—Duane S. Smith
*Attorney, Agent, or Firm*—Cushman, Darby & Cushman IP Group of Pillsbury Madison & Sutro LLP

[57] ABSTRACT

An antidiffusion layer is provided between a first fuel adsorption layer communicated with a fuel tank and a second fuel adsorption layer communicated with air. Since adsorbing ability of the antidiffusion layer is lower than that of the first and second fuel adsorption layers, pore diffusion of the fuel vapor from the first fuel adsorption layer to the second fuel adsorption layer is reduced. Since the antidiffusion layer forms a plurality of nonlinear passages, air diffusion of the fuel vapor is reduced. Therefore, the diffusion of the fuel vapor is suppressed with a thin, small and simple antidiffusion layer, and the canister can be simplified and the reduction of the number of parts and the cost thereof can be realized.

5 Claims, 5 Drawing Sheets

ACTIVATED CHARCOAL CANISTER

BACKGROUND OF THE INVENTION

1. Field of the Invention

The present invention relates to a charcoal canister, used in automobile, motorcycles and the like, for adsorbing fuel vapor.

2. Description of Related Art

Conventional activated charcoal canister which is packed with activated charcoal adsorbs fuel vapor evaporated from a fuel tank under high temperature when an engine is not running. With the engine running, the fuel vapor which is adsorbed by the canister is desorbed and led into combustion chambers of the engine by air which is led into the canister by negative pressure of the engine.

The fuel vapor which is adsorbed by the canister moves inside a pore of the activated charcoal and diffuses through one pore to another between neighboring activated charcoal as time elapses. Furthermore, when fuel of the fuel tank contracts with decreasing temperature, an air flow inside the canister (back purging) is caused by decreased pressure in the fuel tank. This back purging causes a desorption from the pores and a diffusion into the air of the adsorbed fuel vapor. Therefore, the fuel vapor may be released into the air even before the canister reaches the theoretical limit of adsorbing capacity.

In order to overcome the above-mentioned problem, JP-A-5-33734 and JP-U-63-198464 disclose canisters as shown in FIG. 6 and FIG. 7 respectively. In FIG. 6, a downstream end of a main canister 4 which is equipped with a fuel vapor inlet port 41 and a purging port 42, and an upstream end of an additional canister 5 which is equipped with an air inlet port 51 are connected by an air layer 6. In FIG. 7, an air layer 8 is provided between a first activated charcoal layer 71 and a second activated charcoal layer 72. In FIG. 7, the canister has a fuel vapor inlet port 91, a purging port 92 and an air inlet port 93. These conventional canisters inhibit the diffusion of fuel vapor by dividing the activated charcoal canisters with the air layers.

However, according the conventional canister shown in FIG. 6, complexity of the structure of the canister causes a decrease in productivity and an increase in cost because the number of parts increases. Furthermore, it may be difficult to achieve a low pressure loss structure to clear the new fuel vapor regulation in U.S.A. (ORVR) because the pressure loss is high. According to the conventional canister shown in FIG. 7, the canister becomes larger because the air layer requires a large space to prevent the diffusion of the fuel vapor.

SUMMARY OF THE INVENTION

The present invention has an object to provide an activated charcoal canister which can achieve the prevention of fuel vapor diffusion into the air with a simple structure and minimizing the size and the number of parts thereof.

In an activated charcoal canister according to a first aspect of the present invention, an antidiffusion layer is provided between a first fuel adsorption layer and a second fuel adsorption layer.

Since adsorbing ability of the antidiffusion layer is lower than that of the first and second fuel adsorption layers, pore diffusion of the fuel vapor from the first fuel adsorption layer to the second fuel adsorption layer is reduced.

Since the antidiffusion layer forms a plurality of nonlinear passages, air diffusion of the fuel vapor is reduced.

Therefore, the diffusion of the fuel vapor is suppressed with a thin, small and simple antidiffusion layer, and the canister can be simplified and the reduction in the number of parts and the cost thereof can be realized.

According to another aspect of the present invention, the antidiffusion layer is formed by particles whose particle-size distribution is approximately the same as that of the activated charcoal used for the first fuel adsorption layer and the second fuel adsorption layer so that a pressure loss can be minimized.

BRIEF DESCRIPTION OF THE DRAWINGS

Additional objects and advantages of the present invention will be more readily apparent from the following detailed description of preferred embodiments thereof when taken together with the accompanying drawings, in which.

DETAILED DESCRIPTION OF PRESENTLY PREFERRED EMBODIMENTS

Preferred embodiments of the present invention are hereinafter described with reference to the accompanying drawings.

Figure 1A:
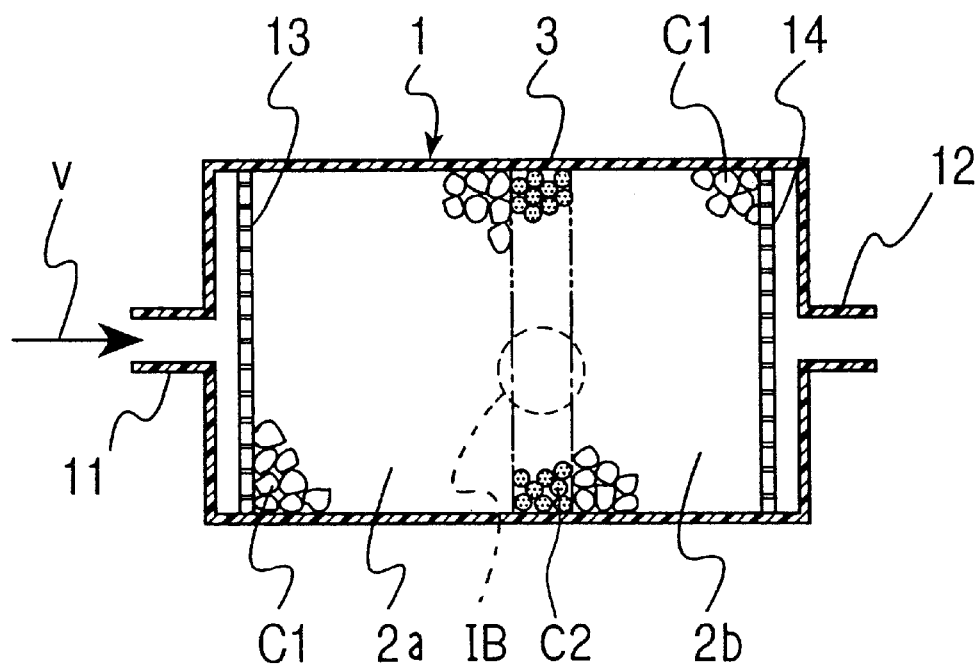
FIG. 1A is a schematic sectional view of an activated charcoal canister according to a first embodiment of the present invention.

In FIG. 1A, a cylindrical container 1 whose both ends are closed has a fuel vapor inlet port 11 which is communicated with a fuel tank at one end (the left end in FIG. 1A) and an air inlet port 12 which is communicated with an air at the other end (the right end in FIG. 1A). Inside the container 1, porous partition walls 13 and 14 are provided near respective ports 11 and 12. Fuel adsorption layers 2a and 2b are formed by filling activated charcoal C1 between the partition walls 13 and 14.

An antidiffusion layer 3 is provided at the axial center of the container 1 so as to divide the fuel adsorption layers 2a and 2b in a direction of the flow of fuel vapor.

Figure 1B:
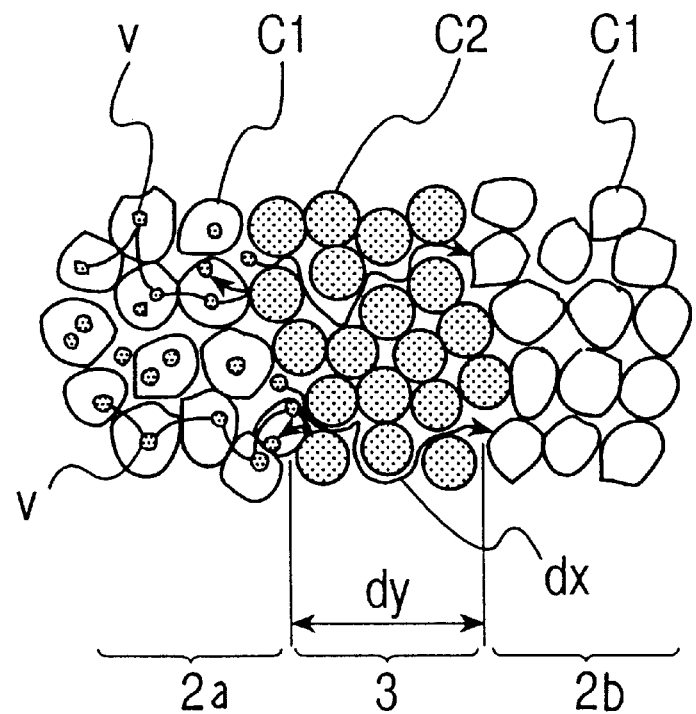
FIG. 1B is a partly enlarged view of FIG. 1A.

The antidiffusion layer 3 is formed by filling activated charcoal C2 which is incapable of adsorbing and desorbing fuel vapor by impregnation of $C_{11}H_{24}$ (normal undecane) as shown in FIG. 1B. Since $C_{11}H_{24}$ which is one of components of fuel has a high boiling point (around 196° C.), it cannot be desorbed from activated charcoal C2 in the atmospheric temperature at 60° C. which is the maximum atmospheric temperature of usual canisters. The antidiffusion layer 3 prevents the activated charcoal C1 of the fuel adsorption layer 2a and the activated charcoal C1 of the fuel adsorption layer 2b from contacting each other.

The particle-size distribution of the activated charcoal C2 is approximately the same as that of the activated charcoal C1. As the particle-size of the activated charcoal C2 becomes smaller, an air passage which is formed by gaps between the activated charcoal C2 becomes longer, and a pressure loss becomes larger.

Figure 2:
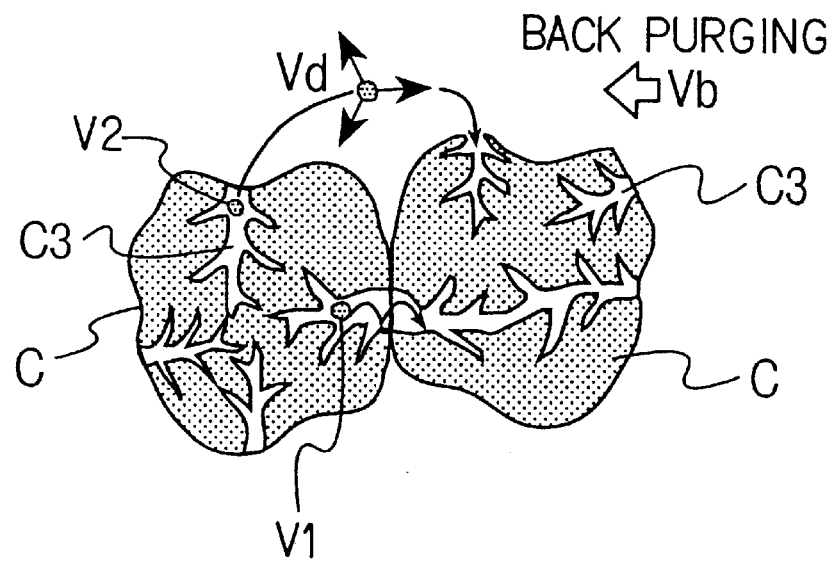
FIG. 2 is a schematic view of a mechanism of diffusion of fuel vapor.

As shown in FIG. 2, there are two kinds of diffusion of fuel vapor. One is a pore diffusion which is a movement of a fuel vapor V1 from an activated charcoal C to neighboring activated charcoal C through pores C3 of the charcoal C. The other is an air diffusion which is a movement of a fuel vapor V2 to the air caused by an air flow (back purging) which is produced by negative pressure when the temperature of fuel is decreased.

The pore diffusion can be suppressed by an isolation of the activated charcoal and the air diffusion can be suppressed by smaller diffusion velocity Vd than a back purging flow velocity Vb.

According to this embodiment of the present invention, when a fuel vapor V is led into the fuel adsorption layer 2a, the fuel vapor V is adsorbed by the activated charcoal C1 of the fuel adsorption layer 2a first.

Then, the fuel vapor V diffuses in the fuel adsorption layer toward the air inlet port 12 as time elapses. However, the diffusion of the fuel vapor V toward the fuel adsorption layer 2b is suppressed because the activated charcoal C2 of the antidiffusion layer 3 are not capable of adsorbing fuel vapor. Thus, the pore diffusion is suppressed.

Furthermore, the length dx of the air passage which is formed by gaps among the activated charcoal C2 is longer than the length dy of the antidiffusion layer 3 because the air passage is not a straight line. Therefore, the diffusion velocity Vd of the fuel vapor V can be small without lengthening dy of the antidiffusion layer 3, i.e., it is possible to prevent the fuel vapor V from diffusing without enlarging canister. Thus the air diffusion is suppressed.

Figure 3:
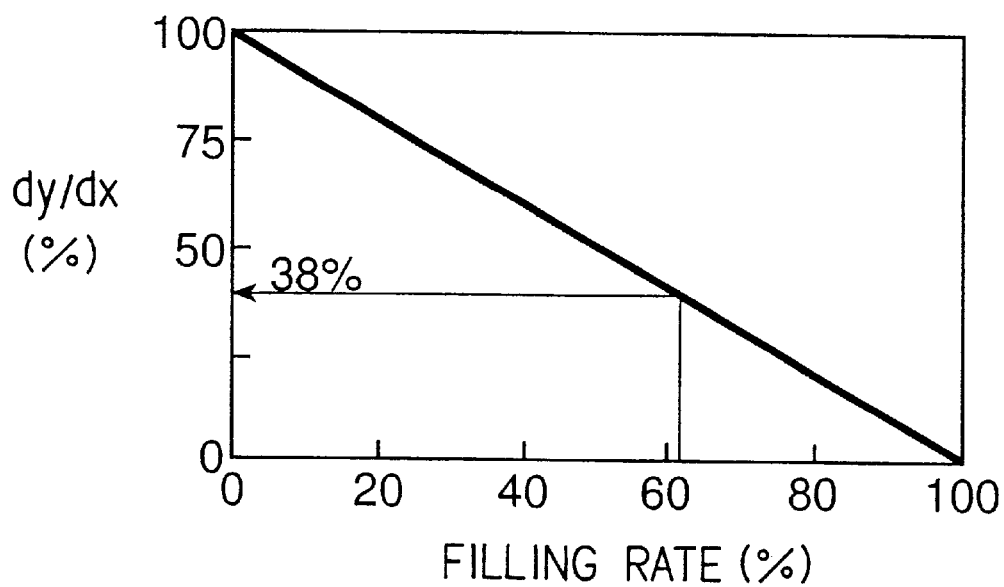
FIG. 3 is a graph showing the relationship between a filling rate of material which is not capable of adsorbing and desorbing fuel vapor and a reduction rate of the length of an antidiffusion layer according to the embodiment of the present invention.

FIG. 3 shows the calculation results for the reduction rate of the length of the antidiffusion layer 3 (dy/dx) when the filling rate of globular material which is not capable of adsorbing and desorbing fuel vapor is changed compared with an air layer. In FIG. 3, filling rate 0% means that the diffusion of fuel vapor is suppressed by an air layer as in the case shown in FIG. 7 (prior art), and filling rate 100% means that the diffusion of fuel vapor is suppressed by an antidiffusion layer which is fully filled with material which is not capable of adsorbing and desorbing fuel vapor. According to this graph, the following equation is obtained.

$$dy = (100 - \text{filling rate})/100 \times dx$$

When activated charcoal which has the same particle-size distribution and which is impregnated with $C_{11}H_{24}$ (normal undecane) is used, the filling rate is 62%. Therefore, it is predictable from FIG. 3 that the reduction rate of the length of the antidiffusion layer 3 (dy/dx) is 38%, i.e., 38% of downsizing of the antidiffusion layer 3 can be possible.

Figure 7:
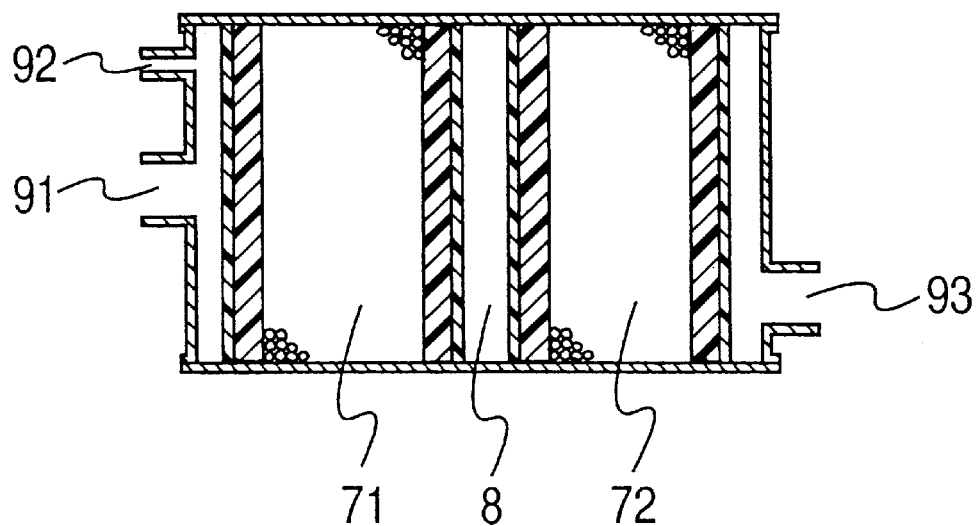
FIG. 7 is a schematic sectional view of another conventional (prior art) canister.
Figure 8:
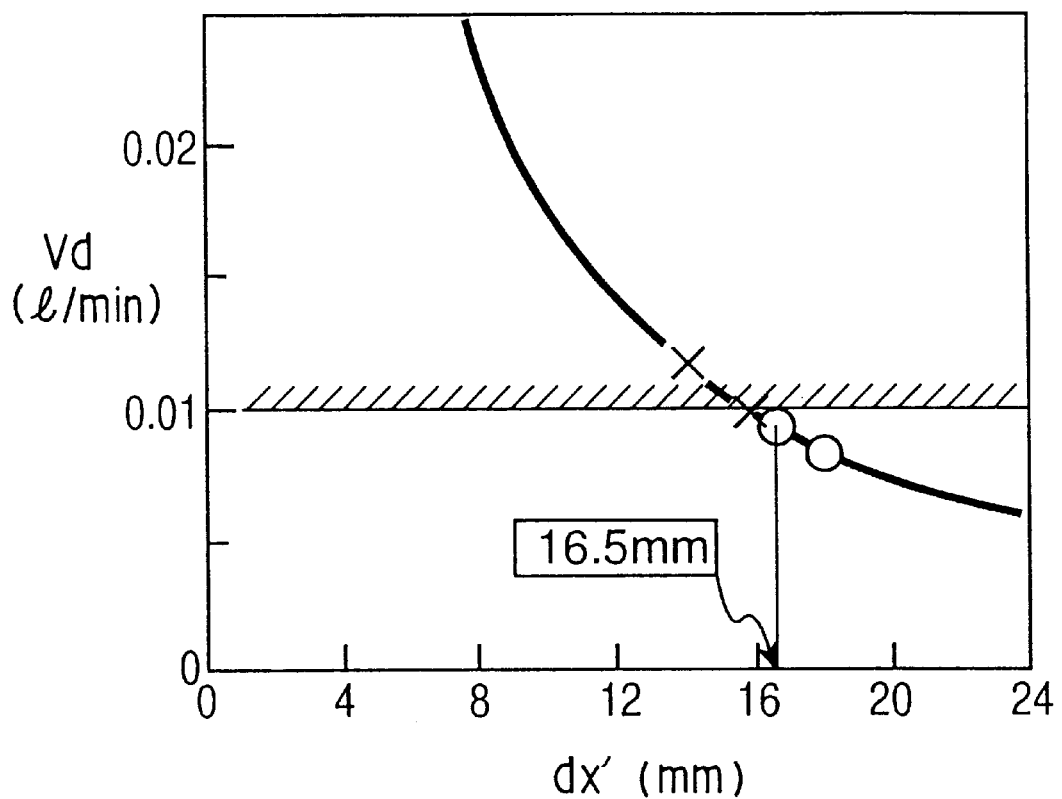
FIG. 8 is a graph showing the relationship between the length of an air layer and a diffusion velocity of fuel vapor according to a conventional (prior art) canister.

FIG. 8 shows the relationship between length of an air layer dx' and diffusion velocity Vd (calculation value) of fuel vapor under the condition that the atmospheric temperature is 60° C. which is the maximum atmospheric temperature around a canister according to a conventional canister which has the air layer between fuel adsorption layers as in the case shown in FIG. 7, when the diffusion of the fuel vapor is investigated under the similar condition that a car is left outside with its engine stopped. According to this experiment, the diffusion of the fuel vapor is suppressed by the air layer when dx' is 16.5 mm.

Since the air diffusion can be suppressed by smaller diffusion velocity Vd than a back purging flow velocity Vb, the back purging flow velocity Vb may be predicted that Vb is greater than 0.01 l/min. According to the conventional canister, an average of the back purging flow velocity Vb is 0.02 l/min. This supports above experimental results.

Figure 4:
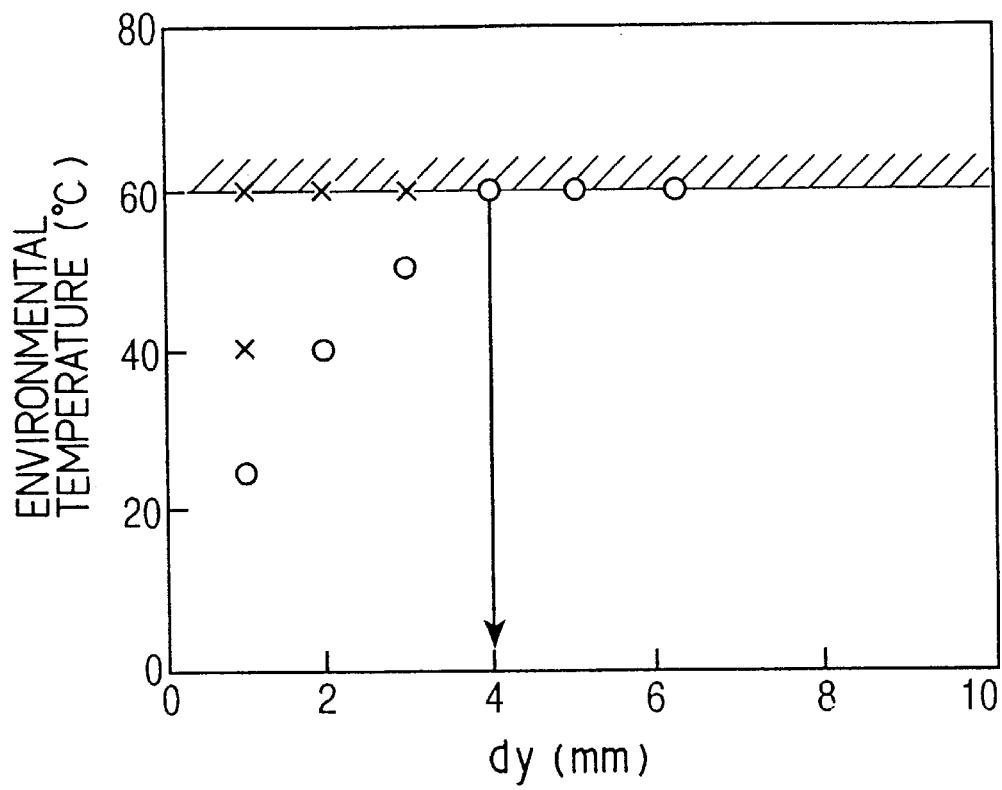
FIG. 4 is a graph showing the relationship between the length of an antidiffusion layer and a diffusion of fuel vapor according to the embodiment of the present invention.
Figure 5:
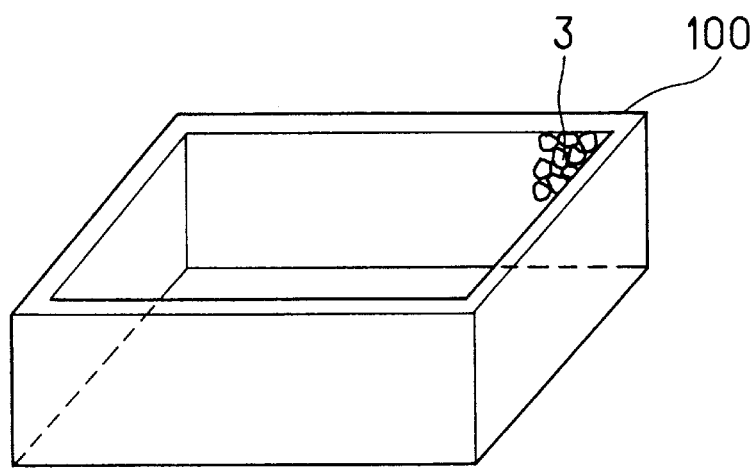
FIG. 5 is a schematic perspective diagram of a second embodiment of the present invention.
Figure 6:
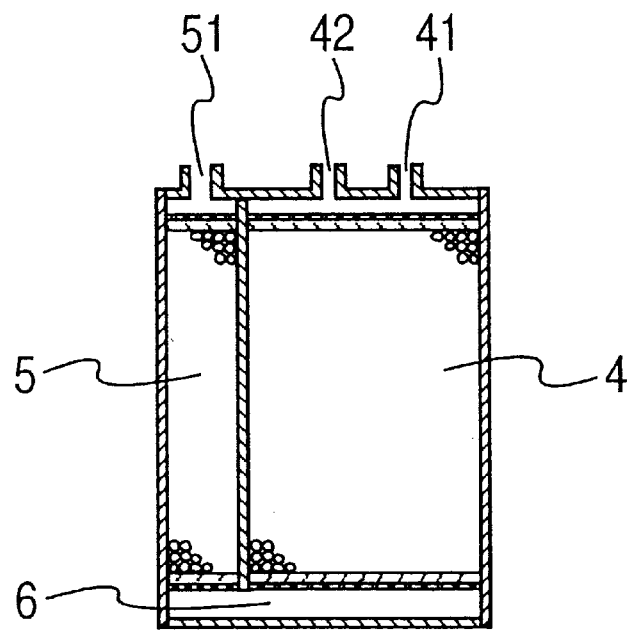
FIG. 6 is a schematic sectional view of a conventional (prior art) canister.

FIG. 4 is an experimental result showing the relationship between the length of the antidiffusion layer 3 (dy) and diffusion of fuel vapor under various environmental temperatures according to the embodiment of the present invention. In FIG. 4, ○ represents no diffusion and x represents diffusion. As shown in FIG. 5, the minimum length of the antidiffusion layer 3 which is required to suppress the diffusion of the fuel vapor at 60° C. is 4 mm.

Therefore, comparing with the conventional canister, the canister of the embodiment can reduce the length dy which is required to suppress the diffusion of the fuel vapor to 4 mm from 16.5 mm. In this embodiment, the reduction rate of the length of the antidiffusion layer 3 (dy/dx) is 24%, that is better than the prediction in FIG. 3. This comes from the difference in shapes between the material used in FIG. 3 and the activated charcoal which are not capable of adsorbing and desorbing fuel vapor of the antidiffusion layer 3. FIG. 3 shows calculation results using globular material while the shape of the activated charcoal which are not capable of adsorbing and desorbing fuel vapor of the antidiffusion layer 3 of the embodiment is not globular.

FIG. 5 is a schematic perspective diagram of the antidiffusion layer 3 in a second embodiment of the present invention. In the second embodiment, the structure of canister is the same as described in the first embodiment except an antidiffusion layer 3. The antidiffusion layer 3 of the second embodiment has a single-cellular structure which is formed by many particles of activated charcoal, however, FIG. 5 does not show all activated charcoal for simplicity.

Manufacturing processes of the antidiffusion layer 3 of the second embodiment are described hereafter.

First, an adhesive is spread on side walls of a box-shaped mold 100 whose upper surface is opened and bottom surface is closed. The adhesive is not spread on the upper and bottom surfaces of the antidiffusion layer 3.

Second, many particles of activated charcoal which are impregnated with a component which has a high boiling point as described in the first embodiment are filled in the box-shaped mold 100.

Then, the activated charcoal and the box-shaped mold 100 are pressed with adding heat to the box-shaped mold 100 so that the activated charcoal are not destroyed. The activated charcoal which are contacting the side walls of the box-shaped mold 100 are connected by the adhesive each other and the activated charcoal contact each other.

Thus, the antidiffusion layer 3 is formed as the single-cellular structure having a shape of a square pole after detaching from the box-shaped mold 100.

According to the antidiffusion layer 3 having the single-cellular structure of the second embodiment, it may be possible to design the length (thickness) of the antidiffusion layer 3 uniformly and to simplify the filling operations compared with filling the activated charcoal in the container 1 described in the first embodiment.

In the first and second embodiments, the activated charcoal which are not capable of adsorbing and desorbing fuel vapor are used for the antidiffusion layer 3, however, it may be possible to use metal particle, ceramic particle or the like which is not capable of adsorbing and desorbing instead. In that cases, it is preferable that a particle-size of such metal or ceramic is approximately the same as that of the activated charcoal of the fuel adsorption layer 2*a* and 2*b* because the pressure loss is minimized.

Above particles can be replaced with other materials which have ventilation and curved air passage, such as a sheet of sponge.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A charcoal canister connectable to a fuel tank, said canister comprising:

a container having at least a fuel vapor inlet port which is connectable to said fuel tank for introducing a fuel vapor from said fuel tank and an air inlet port for introducing air;

an antidiffusion layer for preventing a diffusion of said fuel vapor, said antidiffusion layer provided in said container between said fuel vapor inlet port and said air inlet port;

a first fuel adsorption layer including activated charcoal for adsorbing and desorbing fuel vapor, said first fuel adsorption layer provided in said container between said fuel vapor inlet port and said antidiffusion layer; and a second fuel adsorption layer activated charcoal for adsorbing and desorbing fuel vapor, said second fuel adsorption layer provided in said container between said antidiffusion layer and said air inlet port;

wherein said antidiffusion layer includes;

particles selected such that adsorbing ability thereof for said fuel vapor is lower than that of said activated charcoal of said first fuel adsorption layer, said particles further forming a plurality of nonlinear air passages, and said particles including activated charcoal which is impregnated with hydrocarbon having a high boiling point so as to sufficiently avoid desorption of said hydrocarbon from said activated charcoal when said particles are used for said charcoal canister.

2. A charcoal canister according to claim 1, wherein;

said particles have approximately same particle-size distribution as that of said activated charcoal of said first fuel adsorption layer and said second fuel adsorption layer.

3. A charcoal canister connectable to a fuel tank, said canister comprising:

a container having at least a fuel vapor inlet port which is connectable to said fuel tank to introduce said fuel vapor and an air inlet port for introducing air;

a fuel adsorption layer provided in said container, said fuel adsorption layer including activated charcoal for adsorbing and desorbing said fuel vapor introduced through said fuel vapor inlet port; and an antidiffusion layer, being provided in said container so as to divide said fuel adsorption layer in a direction of a flow of said fuel vapor for preventing a diffusion of said fuel vapor, said antidiffusion layer includes particles selected such that adsorbing ability thereof for said fuel vapor is lower than that of said activated charcoal of said fuel adsorption layer, said particles further forming a plurality of nonlinear air passages wherein said particles include activated charcoal which is impregnated with hydrocarbon having a high boiling point so as to sufficiently avoid desorption of said hydrocarbon from said activated charcoal when said particles are used for said charcoal canister.

4. A charcoal canister according to claim 3, wherein;

said particles have approximately same particle-size distribution as that of said activated charcoal of said fuel adsorption layer.

5. A charcoal canister according to claim 3, wherein;

said antidiffusion layer is formed in a single-cellular structure by said particles.

* * * * *

UNITED STATES PATENT AND TRADEMARK OFFICE
Certificate

Patent No. 5,914,457                                                                                   Patented: June 22, 1999

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Hideaki Itakura, Okazaki, Japan; Naoya Kato, Ama-gun, Japan; Tohru Yoshinaga, Okazaki; and Tokio Kohama, Nishio, Japan.

Signed and Sealed this Twentieth Day of August 2002.

<div align="right">

DAVID A. SIMMONS
*Supervisory Patent Examiner*
Art Unit 1724

</div>